Patented Nov. 2, 1948

2,452,759

UNITED STATES PATENT OFFICE 2,452,759

INSECTICIDE CONTAINING METHYLATED NAPHTHALENE AND 4,4' DICHLORO-DIPHENYL-TRICHLOROETHANE

Julius Hyman, Chicago, Ill., assignor to Velsicol Corporation, Chicago, Ill., a corporation of Illinois No Drawing. Application September 22, 1944, Serial No. 555,395

8 Claims. (Cl. 167—32)

This invention relates to improvements in insecticides and particularly to a novel insecticidal composition characterized by a synergistic association of two known insecticidal substances.

The present invention contemplates the use of dichloro-diphenyl-trichloroethane known commercially and hereinafter in this specification referred to as DDT, and which may include the various isomers thereof, of which 4,4'-dichlorodiphenyl-trichloroethane is considered the most active, as described in United States Patent No. 2,329,074, in association with liquid methylated naphthalene, such as certain refined hydrocarbon oil fractions rich in methylated naphthalenes described in my United States Patent No. 2,347,265.

The term "liquid methylated naphthalene" as herein used is intended to include all liquid hydrocarbons containing a naphthalene nucleus to which is attached at least one methyl group. 1-methyl naphthalene is the simplest member of this group which may, however, include compounds possessing additional methyl groups. Thus, while the first member of the series possesses an appreciable vapor pressure at ordinary temperatures, and a moderate boiling point (465° F.), certain higher methylated naphthalenes possess such low volatilities under ordinary conditions that they may be said to be substantially non-volatile.

The expression "liquid" as herein used, is further intended to include methylated naphthalene mixtures which are fluid, even though certain constituents would, in an isolated state, be solid.

Among the objects of the present invention is the production of an insecticide or insecticidal composition which has the combined property of rapid "knockdown," or paralysis, and high percentage of kill, which is simultaneously destructive of a large variety of insects and allied forms of life, such as mites, which is of a tenacious and lasting quality, and which presents an economy of materials.

Although DDT is very effective in killing many forms of insect life, such as flies, mosquitoes, bedbugs, coddling moths and others, it is notoriously slow in its rate of "knockdown." This limitation is an important one in many cases, as is obvious in the case of mosquitoes and flies where a rapid "knockdown" is important in order to eliminate annoyance as well as the possible spread of disease. Also, as noted, although DDT is highly effective in killing many insects, it is not markedly or rapidly effective as to others, particularly such allied forms of life as mites, e. g., red spiders and chiggers.

Further, DDT is only slightly soluble in the common solvents such as kerosene or mineral oil, the solubility in both cases being of the order of about 5%. This makes it necessary in certain instances to apply and transport unwieldly quantities of spray made with these solvents in order to apply a given dose of DDT, and when applied to dusts limits sharply the percentage of DDT which can be used. On the other hand, while DDT is highly soluble in solvents such as xylene and cyclohexanone, the use of these solvents is open to two objections, namely, the expense of such inert or non-insecticidal agents, and the fact that these solvents evaporate quickly, leaving behind only crystals of DDT which may soon be blown away or washed off of the sprayed surface, and which by the same token are less likely to adhere to insects which contact them.

The methylated naphthalene insecticides aforementioned are characterized by rapid knockdown of many flying insects, such as flies and mosquitoes, and a considerable degree of mortality as to these and other insects, including allied forms of life, such as mites.

By combining the two insecticides a synergistic association is formed which at once has the properties of unexpectedly improved knockdown and enhanced kill, the property of more general application, the ability simultaneously to kill a greater variety of insects and allied forms of life which may be present in the same location, and an increase in effectiveness of the DDT to such a marked extent that considerable economy in the use of this expensive and currently critical material is accomplished. Thus, highly effective results have been obtained in formulations containing as little as 0.1% of DDT whereas in the absence of methylated naphthalenes at least 1.0% of DDT would be required to bring about a comparable result.

Methylated naphthalenes show a high solvency for DDT, and will often hold up to about 60% by weight in solution at 77° F. It is thus possible to produce DDT concentrates, which show important synergism along with economy in packaging, transportation and application. Such concentrates may be used as is, or in emulsions, aerosols, sprays or dust additives, or they may be compounded and/or diluted, and used as desired.

While the following examples are limited as to species of insects, the value of DDT-methylated naphthalene combinations has been demonstrated for many species including:

Greenhouse leaf tyer (*Phlyetaenia rubigalis*)
Rose leaf roller (*Archips rosaceana*)
Imported cabbage worm (*Ascia rapae*)
Cabbage looper (*Autographa brassieae*)
Colorado potato beetle (*Leptinotarsus decimlineata D.*)
European Corn Borer (*Pyrausta nubilalis*)
Chrysanthemum thrips (*Thrips chrysanthemi*)
Onion thrips (*Thrips tabaci*)
Sugar beet thrips (*Hercothrips femoralis*)
Black chrysanthemum aphid (*Macrosiphonella sanborni*)
Green chrysanthemum aphid (*Colorodoa rufomaculata*)
Bean aphid (*Aphis rumicis*)
Potato aphid (*Microsiphum solanifoli*)
Pea aphid (*Illinoia pisi*)
Common red spider (*Tetranychus telarius*)
Mosquitoes, etc.

*Example I*

Three aqueous emulsions were tested by spraying the adult red spider (*Tetranychus telarius*) on greenhouse roses, one containing DDT as the active insecticide, another methylated naphthalene insecticide, and third both. These tests indicate a synergistic action between methylated naphthalene and DDT inasmuch as the mortality found was considerably greater than might have been anticipated if the action of the constituents had been simply additive.

| Material or Formulation Used | Dilution of Formulation in Water (Volume) | Per Cent Active Ingredients in Diluted Spray | Per Cent Kill of Adult Red Spider on Greenhouse Rose in 48 hours. (Average 5-9 tests) |
|---|---|---|---|
| 50% Velsicol AR-60<br>30% Emulsifier<br>20% Coconut Oil | 1-400 | Velsicol, .125 | 18 |
| 50% Acetone<br>30% Emulsifier<br>20% Coconut Oil<br>1 lb. DDT per gal. of insecticide. | 1-400 | DDT, .0312 | 22 |
| 50% Velsicol AR-60<br>30% Emulsifier<br>20% Coconut Oil<br>1 lb. DDT per gal. of insecticide. | 1-400 | Velsicol, .125<br>DDT, .0312 | 84 |

*Example II*

Five liquid formulations were tested on the common housefly (*musca domestica*) according to the Peet-Grady large group method, (Soap "Blue Book," 1940), currently considered as the standard method for testing the action of insecticides on houseflies. The first formulation contained methylated naphthalenes as the essential active ingredient, and the second included, in addition, 0.1% of DDT. The third and fourth formulations were similar to the first and second but contained a larger proportion of the methylated naphthalenes. The fifth formulation contained 0.1% of DDT as the active ingredient, with methylated naphthalenes absent.

The values set forth in the following table are each based on the average of ten or more tests. They clearly indicate that although DDT, as recognized, is notoriously slow in knockdown, the association of minute quantities of DDT with methylated naphthalenes markedly increases the knockdown rate of the latter. Thus, the addition of 0.1% DDT to test formulations 1 and 3, resulting in test formulations 2 and 4, accomplished a reduction of 31% and 19% respectively in the 90% knockdown time. No perceptible increase in rate of knockdown could have been anticipated if the action of the constituents had been simply additive. This synergistic effect is further indicated by the Peet-Grady ratings.

| Formulations | Test No.— | | | | |
|---|---|---|---|---|---|
| | (1) | (2) | (3) | (4) | (5) |
| Velsicol AR-50, percent by volume | 25 | 25 | 30 | 30 | 0 |
| Deobase, do | 75 | 75 | 70 | 70 | 100 |
| DDT (grams per 100 ml. liquids) | 0 | 0.1 | 0 | 0.1 | 0.1 |
| 90% Knockdown (minutes) | 5 | 3¼ | 4 | 3¼ | >30 |
| Peet-Grady Rating | −12.5 | +30 | +4.3 | +40 | (¹) |

¹ A Peet-Grady rating in test No. 5 could not be obtained because of the slow knockdown time; that is, the mixture gave no knockdown in ten minutes.

It will be understood that the foregoing examples are cited solely for the purpose of illustration and not limitation. The methylated naphthalene insecticidal material specified in Example II and designated as Velsicol AR-50 consisted of a mixture of refined hydrocarbons, which mixture boiled between about 450 and 500° F. (Engler), and contained upward of 70% mono-, di- and tri-methyl naphthalenes, the remaining hydrocarbons consisting of various higher boiling alkanes, alkenes and aromatics. The Velsicol AR-60 employed in Example I consisted of a mixture of refined hydrocarbons which mixture boiled between about 500 and 550° F. (Engler), and contained upward of 70% polyalkylated naphthalenes.

I claim as my invention:

1. An insecticide containing as active ingredients an insect toxic proportion of methylated naphthalene and 4,4' dichloro-diphenyl-trichloroethane.

2. An insecticide containing as an active ingredient an insect toxic proportion of methylated naphthalene in synergistic association with 4, 4' dichloro-diphenyl-trichloroethane.

3. An insecticide comprising an insect toxic proportion of liquid methylated naphthalene of low volatility having dissolved therein 4, 4' dichloro-diphenyl-trichloroethane.

4. An insecticide comprising as active ingredients a refined hydrocarbon oil fraction of low volatility containing an insect toxic proportion of methylated naphthalene, and having dissolved therein 4, 4' dichloro-diphenyl-trichloroethane.

5. An insecticidal composition comprising as active ingredients a refined substantially non-volatile hydrocarbon oil fraction containing an insect toxic proportion of methylated naphthalene and having dissolved therein 4, 4' dichloro-diphenyl-trichloroethane.

6. An insecticide containing as active ingredients an insect toxic proportion of liquid methylated naphthalene of low volatility having dissolved therein from about 0.1 per cent to about 60 per cent by weight of 4, 4' dichloro-diphenyl-trichloroethane.

7. An insecticidal material comprising dust impregnated with an insect toxic proportion of liquid methylated naphthalene having dissolved therein 4, 4' dichloro-diphenyl-trichloroethane.

8. An insecticidal material comprising an aqueous emulsion containing an insect toxic proportion of liquid methylated naphthalene having dissolved therein 4, 4' dichloro-diphenyl-trichloroethane.

JULIUS HYMAN.

REFERENCES CITED

The following references are of record in the file of this patent:

UNITED STATES PATENTS

| Number | Name | Date |
|---|---|---|
| Re. 22,700 | Muller | Dec. 4, 1945 |
| 2,329,074 | Muller | Sept. 7, 1943 |
| 2,347,265 | Hyman | Apr. 25, 1944 |
| 2,349,434 | Hyman | May 23, 1944 |

OTHER REFERENCES

Journal of Economic Entomology, February, 1944, page 127, by Madden et al.; page 154 by Harrison.